United States Patent
Shimizu et al.

(10) Patent No.: US 11,767,705 B2
(45) Date of Patent: Sep. 26, 2023

(54) GLASS PANEL UNIT MANUFACTURING METHOD

(71) Applicant: PANASONIC INTELLECTUAL PROPERTY MANAGEMENT CO., LTD., Osaka (JP)

(72) Inventors: Takeshi Shimizu, Osaka (JP); Masataka Nonaka, Osaka (JP); Haruhiko Ishikawa, Osaka (JP); Eiichi Uriu, Osaka (JP); Kazuya Hasegawa, Osaka (JP); Tasuku Ishibashi, Ishikawa (JP); Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 538 days.

(21) Appl. No.: 17/059,009

(22) PCT Filed: Apr. 15, 2019

(86) PCT No.: PCT/JP2019/016173
§ 371 (c)(1),
(2) Date: Nov. 25, 2020

(87) PCT Pub. No.: WO2019/230220
PCT Pub. Date: Dec. 5, 2019

(65) Prior Publication Data
US 2021/0207427 A1    Jul. 8, 2021

(30) Foreign Application Priority Data

May 30, 2018  (JP) ................................ 2018-104076

(51) Int. Cl.
*E06B 3/677*    (2006.01)
*C03C 27/06*    (2006.01)
(Continued)

(52) U.S. Cl.
CPC .............. *E06B 3/677* (2013.01); *C03C 27/06* (2013.01); *E06B 3/6612* (2013.01); *E06B 3/6736* (2013.01)

(58) Field of Classification Search
None
See application file for complete search history.

(56) References Cited

U.S. PATENT DOCUMENTS

2012/0148795 A1    6/2012   Kwon et al.
2014/0034218 A1    2/2014   Hogan et al.
(Continued)

FOREIGN PATENT DOCUMENTS

CN    203999341 U    12/2014
CN    204298258 U    4/2015
(Continued)

OTHER PUBLICATIONS

International Search Report and Written Opinion issued in International Patent Application No. PCT/JP2019/016173, dated Jun. 11, 2019; with partial English translation.

*Primary Examiner* — Barbara J Musser
(74) *Attorney, Agent, or Firm* — McDermott Will & Emery LLP

(57) ABSTRACT

A glass panel unit manufacturing method includes a bonding step, an insertion step, an evacuation step, and a sealing step. The bonding step includes bonding a first substrate having an evacuation port and a second substrate together with a bonding material provided between the first substrate and the second substrate and having a frame shape to form an internal space. The insertion step includes inserting a sealing material into the evacuation port. The evacuation step includes evacuating the internal space through the exhaust passage. The sealing step includes deforming the sealing material by heating while an evacuated state in the internal space is maintained. In a state where the sealing material (Continued)

blocks ventilation between the evacuation port and the internal space, gas is supplied through the exhaust passage toward the evacuation port.

13 Claims, 12 Drawing Sheets

(51) Int. Cl.
*E06B 3/66* (2006.01)
*E06B 3/673* (2006.01)

(56) References Cited

U.S. PATENT DOCUMENTS

| | | |
|---|---|---|
| 2016/0193818 A1 | 7/2016 | Hogan et al. |
| 2017/0361598 A1 | 12/2017 | Hogan et al. |
| 2019/0168496 A1 | 6/2019 | Hogan et al. |

FOREIGN PATENT DOCUMENTS

| | | | |
|---|---|---|---|
| JP | 2001-354456 A | 12/2001 | |
| JP | 2013-508260 A | 3/2013 | |
| JP | 2015-529623 A | 10/2015 | |
| JP | 2017-141136 A | 8/2017 | |
| KR | 10-2011-0077893 A | 7/2011 | |
| WO | WO-2017170076 A1 * | 10/2017 | ......... C03B 23/0086 |

* cited by examiner

GLASS PANEL UNIT MANUFACTURING METHOD

CROSS-REFERENCE OF RELATED APPLICATIONS

This application is the U.S. National Phase under 35 U.S.C. § 371 of International Patent Application No. PCT/JP2019/016173, filed on Apr. 15, 2019, which in turn claims the benefit of Japanese Application No. 2018-104076, filed on May 30, 2018, the entire disclosures of which Applications are incorporated by reference herein.

TECHNICAL FIELD

The present disclosure relates to a glass panel unit manufacturing method.

BACKGROUND ART

A thermally insulating glass panel unit is obtained by reducing the pressure in an internal space formed between a pair of substrates arranged to face each other and hermetically sealing the internal space while maintaining the reduced pressure there.

Patent Literature 1 discloses a technique according to which an exhaust pipe made of glass is connected to an evacuation port formed in one of a pair of substrates, the pressure in an internal space is reduced through the exhaust pipe, and then the exhaust pipe is melted by heat and is cut off.

The known technique of the background art leaves a trace of the exhaust pipe thus cut off on an outer surface of a glass panel unit thus formed.

CITATION LIST

Patent Literature

Patent Literature 1: JP 2001-354456 A

SUMMARY OF INVENTION

It is an object of the present disclosure to provide a glass panel unit having evacuated internal space, such that no trace of an exhaust pipe is left thereon.

A glass panel unit manufacturing method according to one aspect of the present disclosure includes a bonding step, an insertion step, an evacuation step, and a sealing step. The bonding step is a step of bonding a first substrate and a second substrate together with a bonding material provided between the first substrate and the second substrate and having a frame shape to form an internal space. The first substrate includes a glass panel and has an evacuation port. The second substrate includes a glass panel. The internal space is surrounded by the bonding material between the first substrate and the second substrate. The insertion step is a step of inserting a sealing material into the evacuation port of the first substrate. The evacuation step is a step of evacuating the internal space through an exhaust passage by detachably connecting the exhaust passage to the evacuation port. The sealing step is a step of: deforming the sealing material by heating; and sealing the evacuation port with the sealing material deformed by being heated while an evacuated state in the internal space is maintained. The sealing step includes supplying gas through the exhaust passage toward the evacuation port in a state where the sealing material softened by being heated blocks ventilation between the evacuation port and the internal space.

DESCRIPTION OF EMBODIMENTS

Embodiment

Figure 1:
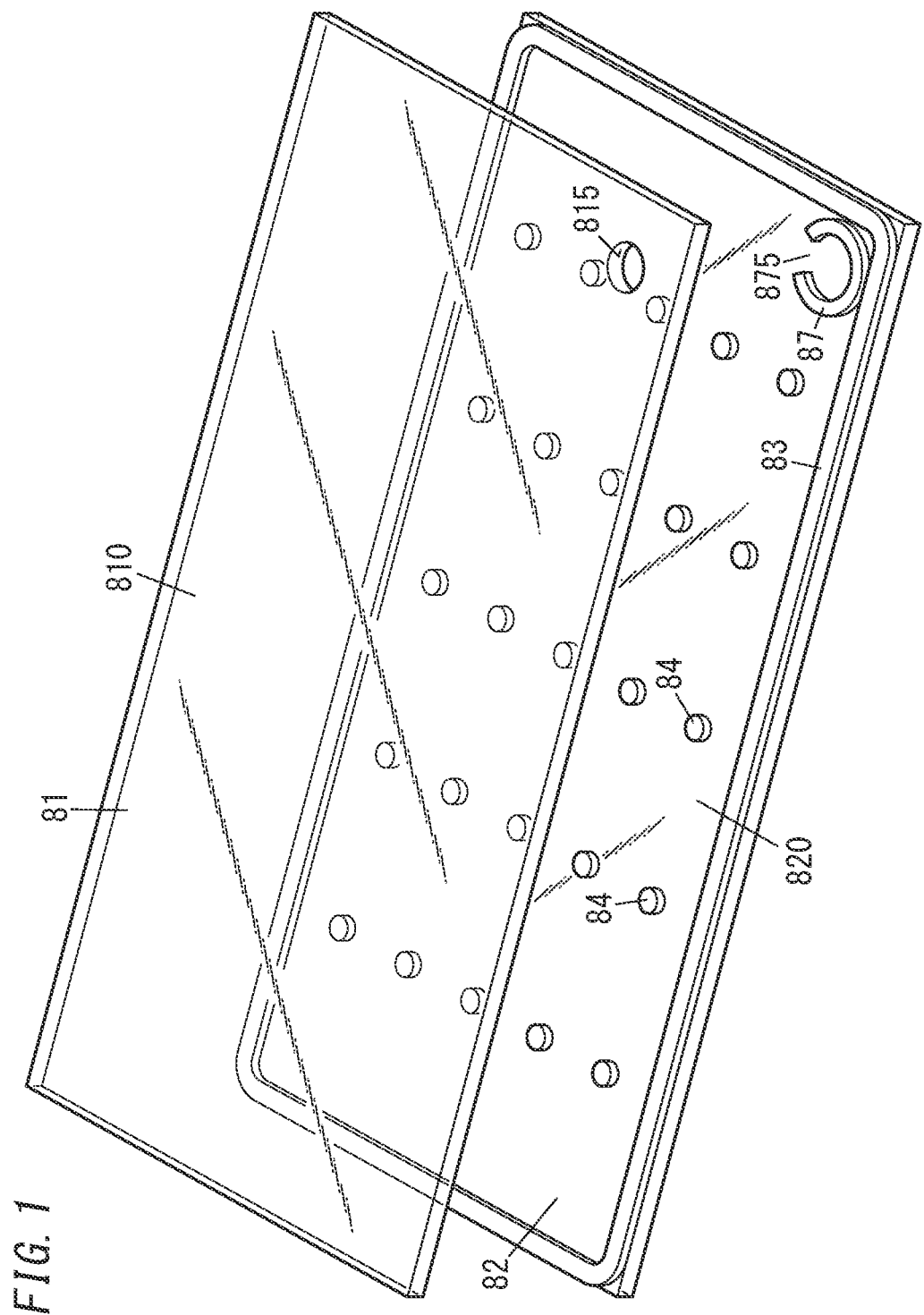
FIG. 1 is a perspective view illustrating a bonding step of a glass panel unit manufacturing method of one embodiment.

A glass panel unit manufacturing method of one embodiment (hereinafter simply referred to as a "manufacturing method of one embodiment") will be described).

The manufacturing method of the one embodiment is a method for manufacturing a glass panel unit 9 and includes a bonding step, an insertion step, an evacuation step, and a sealing step.

In the manufacturing method of the one embodiment, the bonding step is first performed to form a work in progress 8. The work in progress 8 is an intermediate product obtained while the glass panel unit 9 is manufactured. In the insertion step performed after the bonding step, a sealing material 89 is inserted into an evacuation port 815 of the work in progress 8 thus formed. In the evacuation step and the sealing step performed after the insertion step, an internal space 85 is evacuated and sealed with an exhaust device 1 and a sealing head 7 shown in FIG. 8, thereby manufacturing the glass panel unit 9 having high thermal insulation properties. Each of the steps will be described in detail below.

First of all, the bonding step will be described. As illustrated in FIG. 1 and the like, the bonding step includes disposing a first substrate 81, a second substrate 82, a bonding material 83, a plurality of pillars 84, and a dam 87 at respective prescribed locations. Specifically, the bonding material 83, the dam 87, and the plurality of pillars 84 are disposed on one surface of the second substrate 82 (in other words, an upper surface of the second substrate 82). The first substrate 81 is located above and faces the second substrate 82.

The first substrate 81 includes a glass panel 810 which is light transmissive. The second substrate 82 includes a glass panel 820 which is light transmissive. In the following description, the glass panel 810 included in the first substrate 81 is referred to as a first glass panel 810, and the glass panel 820 included in the second substrate 82 is referred to as a second glass panel 820.

Examples of materials for the first glass panel 810 and the second glass panel 820 include, but not limited to, soda-lime glass, high strain-point glass, chemically strengthened glass, no-alkali glass, quartz glass, Neoceram, and thermally strengthened glass.

Figure 3:
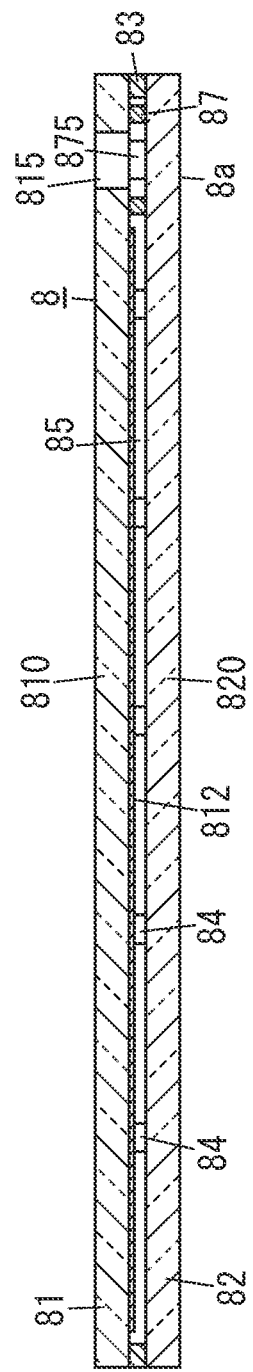
FIG. 3 is a sectional view along line A-A of FIG. 2.
Figure 4:
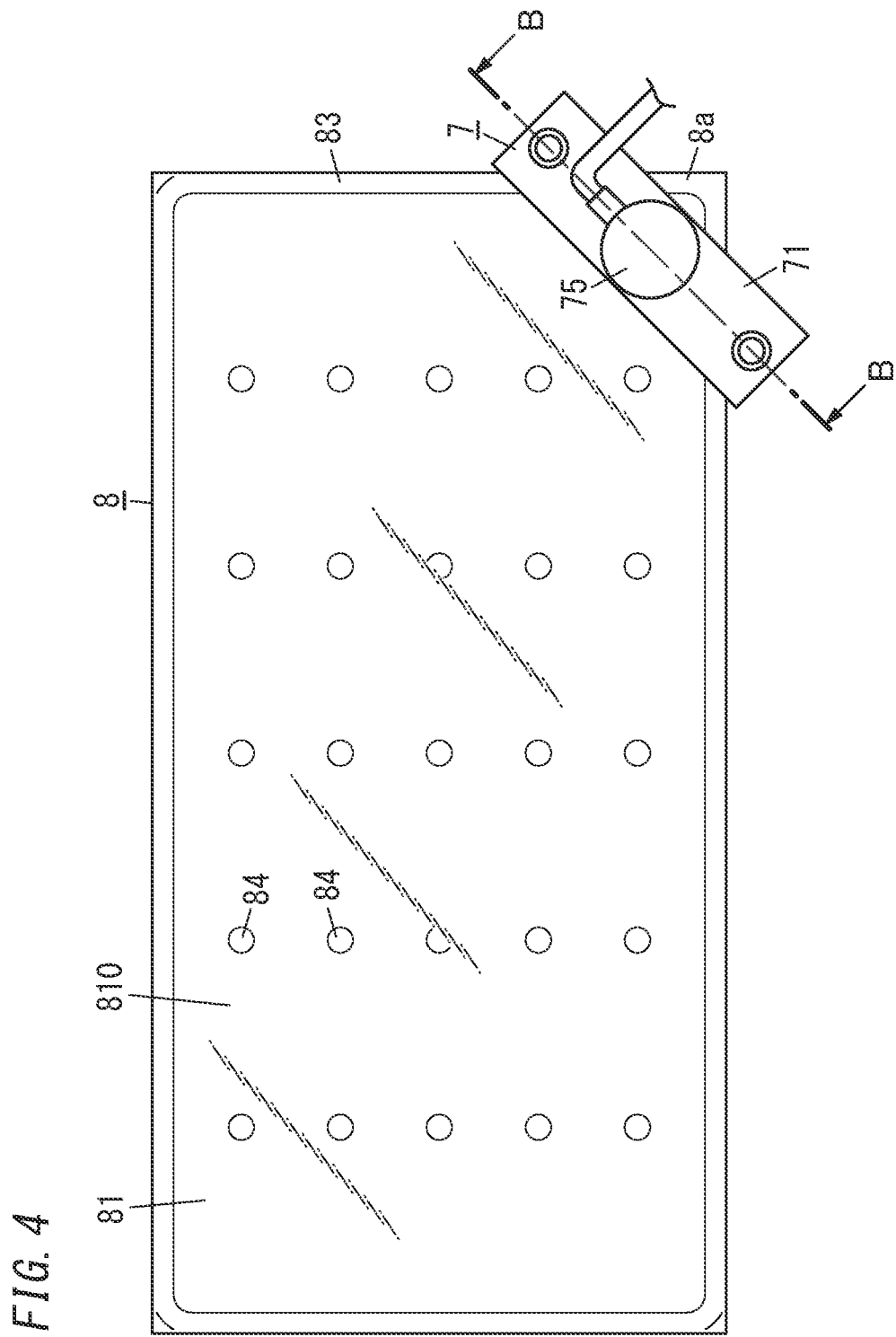
FIG. 4 is a plan view illustrating an evacuation step of the manufacturing method.

As illustrated in FIG. 3, a low-emissivity film 812 is bonded to one surface of the first glass panel 810 (in other words, a lower surface of the first glass panel 810). The first substrate 81 has a surface which faces the second substrate 82 and most of which is a surface of the low-emissivity film 812. The low-emissivity film 812 is a film containing metal, such as silver, with low emissivity and has the capability of reducing the transfer of heat due to radiation. The second substrate 82 has a surface which faces the first substrate 81 and which is a surface of the second glass panel 820.

For the first substrate 81, the low-emissivity film 812 is not essential, and the first substrate 81 does not have to include the low-emissivity film 812. The first substrate 81 may include, in place of the low-emissivity film 812, a film having a function different from the low-emissivity film 812. Similarly, the second substrate 82 may include the low-emissivity film or may include a film having a function different from the low-emissivity film.

The first substrate 81 has the evacuation port 815. The evacuation port 815 penetrates the first substrate 81 in a thickness direction of the first substrate 81. The evacuation port 815 penetrates the first glass panel 810 in a thickness direction of the first glass panel 810.

The bonding material 83 is disposed on the second substrate 82 (i.e., the second glass panel 820) by an application apparatus such as a dispenser. As illustrated in FIG. 1, the bonding material 83 is disposed to have a frame shape along an outer peripheral edge of the one surface of the second substrate 82 (in other words, the upper surface of the second substrate 82).

The dam 87 is disposed on the second substrate 82 (i.e., the second glass panel 820) by an application apparatus such as a dispenser in the same manner. The dam 87 is a portion for restricting a deformation range of the sealing material 89.

The dam 87 is disposed at a prescribed location on the one surface of the second substrate 82 (in other words, the upper surface of the second substrate 82). The bonding material 83 and the dam 87 are preferably made of the same material (e.g., glass frit) but may be made of different materials. The shape of the dam 87 is an annular shape having a cut-off 875 and is more specifically C-shaped, but the shape of the dam 87 is not limited to this example.

The plurality of pillars 84 are arranged in a regular pattern within an area which is part of the one surface of the second substrate 82 and which is surrounded by the bonding material 83. The dimensional shape, the number, and the pattern of the plurality of pillars 84 are not particularly limited. The plurality of pillars 84 are preferably made of a resin, but this should not be construed as limiting. The plurality of pillars 84 may be made of, for example, metal.

In the bonding step, the first substrate 81 and the second substrate 82 disposed to face each other as described above are hermetically bonded together via the bonding material 83.

Specifically, the first substrate 81 and the second substrate 82 between which the bonding material 83, the dam 87, and the plurality of pillars 84 are sandwiched are heated in a bonding furnace such as a circulating hot air oven, the bonding material 83 is once softened by heat, and then, the bonding material 83 is cured as the temperature lowers.

The internal space 85 is formed between the first substrate 81 and the second substrate 82 through the bonding step (see, for example, FIG. 3). The internal space 85 is surrounded by the first substrate 81, the second substrate 82, and the bonding material 83 and is communicated with the outside space through only the evacuation port 815.

Figure 2:
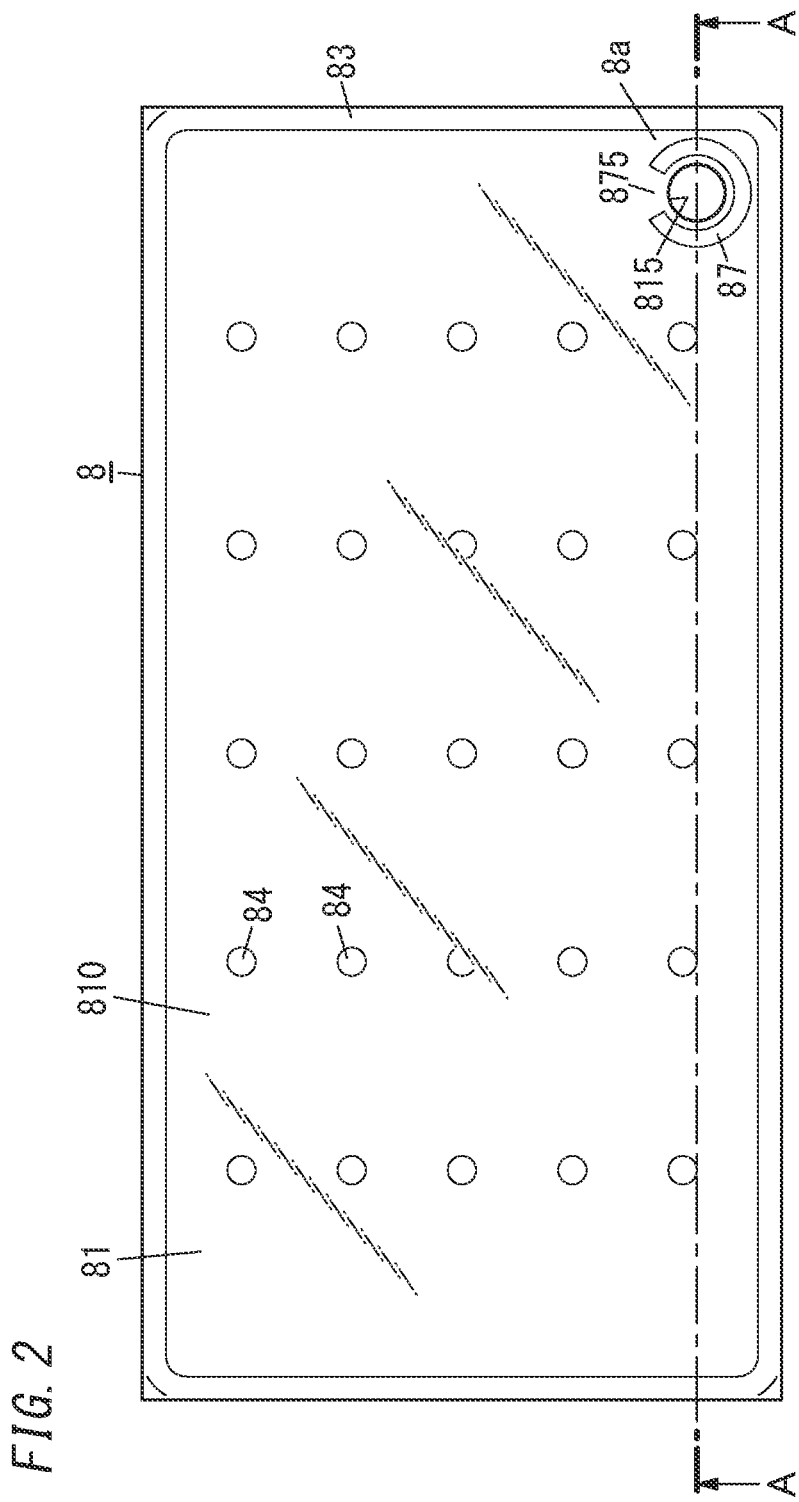
FIG. 2 is a plan view illustrating a work in progress formed by the bonding step.

As illustrated in FIG. 2, the evacuation port 815 of the first substrate 81 is surrounded by the dam 87 when viewed in a direction in which the first substrate 81 and the second substrate 82 face each other. In the manufacturing method of the one embodiment, the dam 87 has the one cut-off 875, but the dam 87 may have a plurality of cut-offs 875.

Next, the insertion step will be described. The insertion step is a step prior to the evacuation step and the sealing step and includes inserting the sealing material 89 and a plate 88 in this order into the evacuation port 815 of the work in progress 8. The sealing material 89 is, for example, a solid sealing material formed from glass frit. The plate 88 is a disk-shaped plate made of, for example, metal.

Each of the sealing material 89 and the plate 88 has an outer shape smaller than the outer shape of the evacuation port 815. The sealing material 89 is sandwiched between the plate 88 inserted in the evacuation port 815 and the second substrate 82.

Next, the evacuation step will be described. The evacuation step is executed by the exhaust device 1 and the sealing head 7 connected thereto. The sealing head 7 is detachably attached to a corner portion 8a of the work in progress 8.

Figure 5:
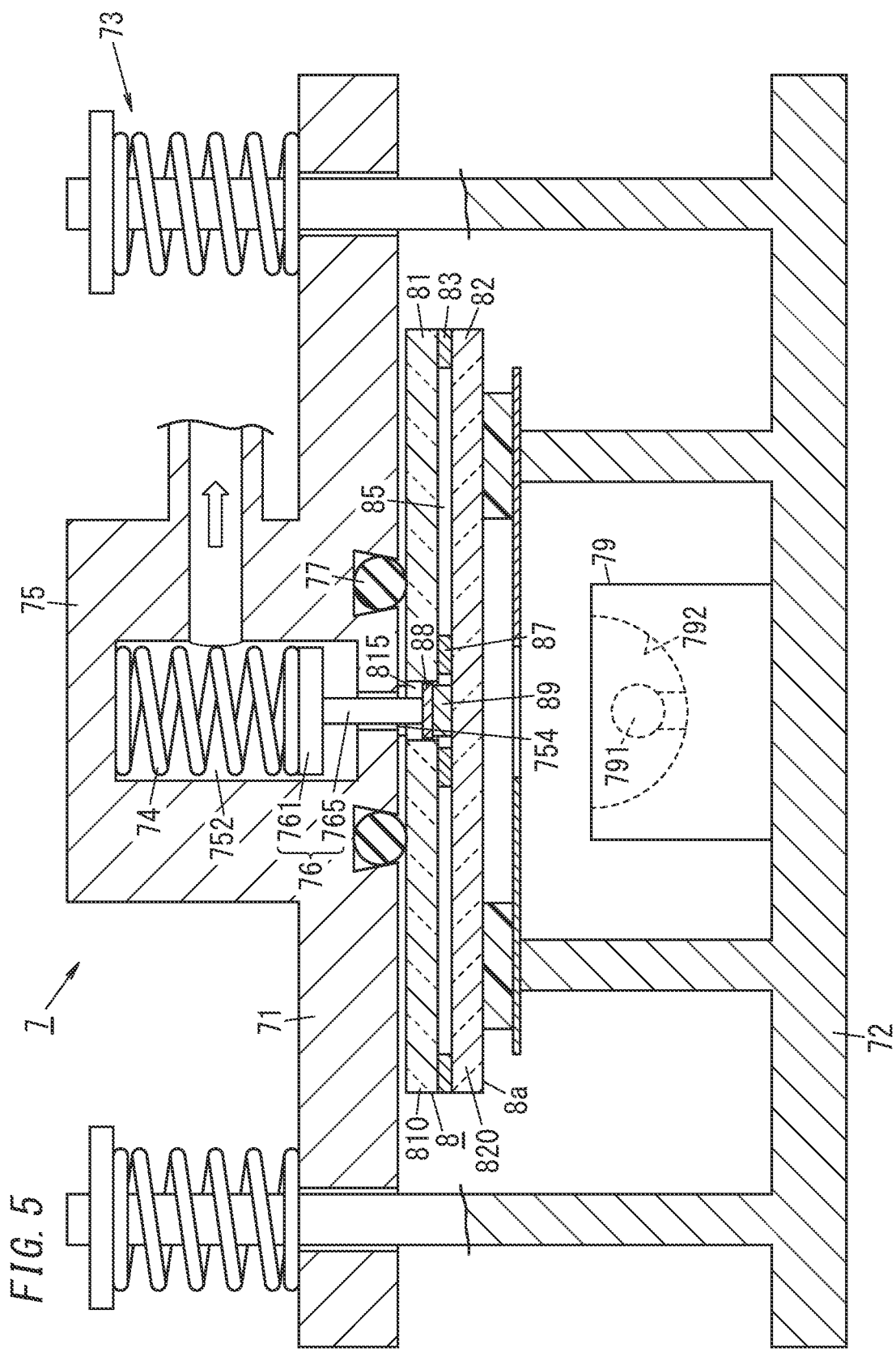
FIG. 5 is a sectional view taken along line B-B of FIG. 4.

As illustrated in FIG. 5 and the like, the sealing head 7 includes an tubular section 75 for exhaustion, a first frame 71 supporting the tubular section 75, a heater 79, a second frame 72 supporting the heater 79, and the spring mechanism 73. The spring mechanism 73 is configured to apply biasing force to the first frame 71 and the second frame 72 in a direction in which the first frame 71 and the second frame 72 come close to each other. The first frame 71 and the second frame 72 are coupled to each other to be relatively displaceable in a direction in which the first substrate 81 and the second substrate 82 face each other.

The biasing force applied by the spring mechanism 73 presses the first frame 71 from above against the first substrate 81 and the second frame 72 from below against the second substrate 82.

The tubular section 75 has an evacuation space 752 formed in its interior. An opening 754 communicated with the evacuation space 752 is formed in a lower surface of the tubular section 75 (in other words, a surface of the tubular section 75 which faces the first substrate 81).

Figure 8:
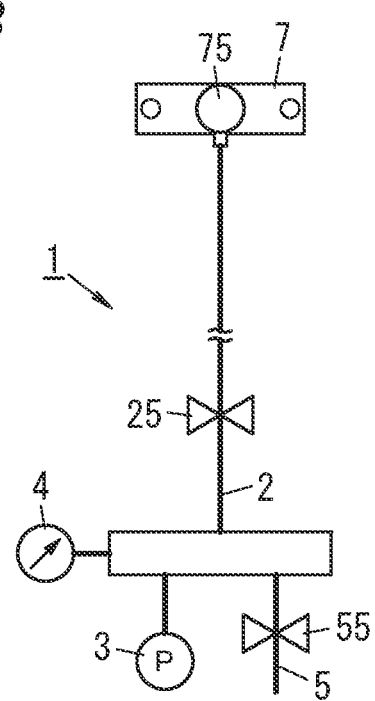
FIG. 8 is a schematic diagram illustrating an exhaust device used in the manufacturing method.
Figure 9:
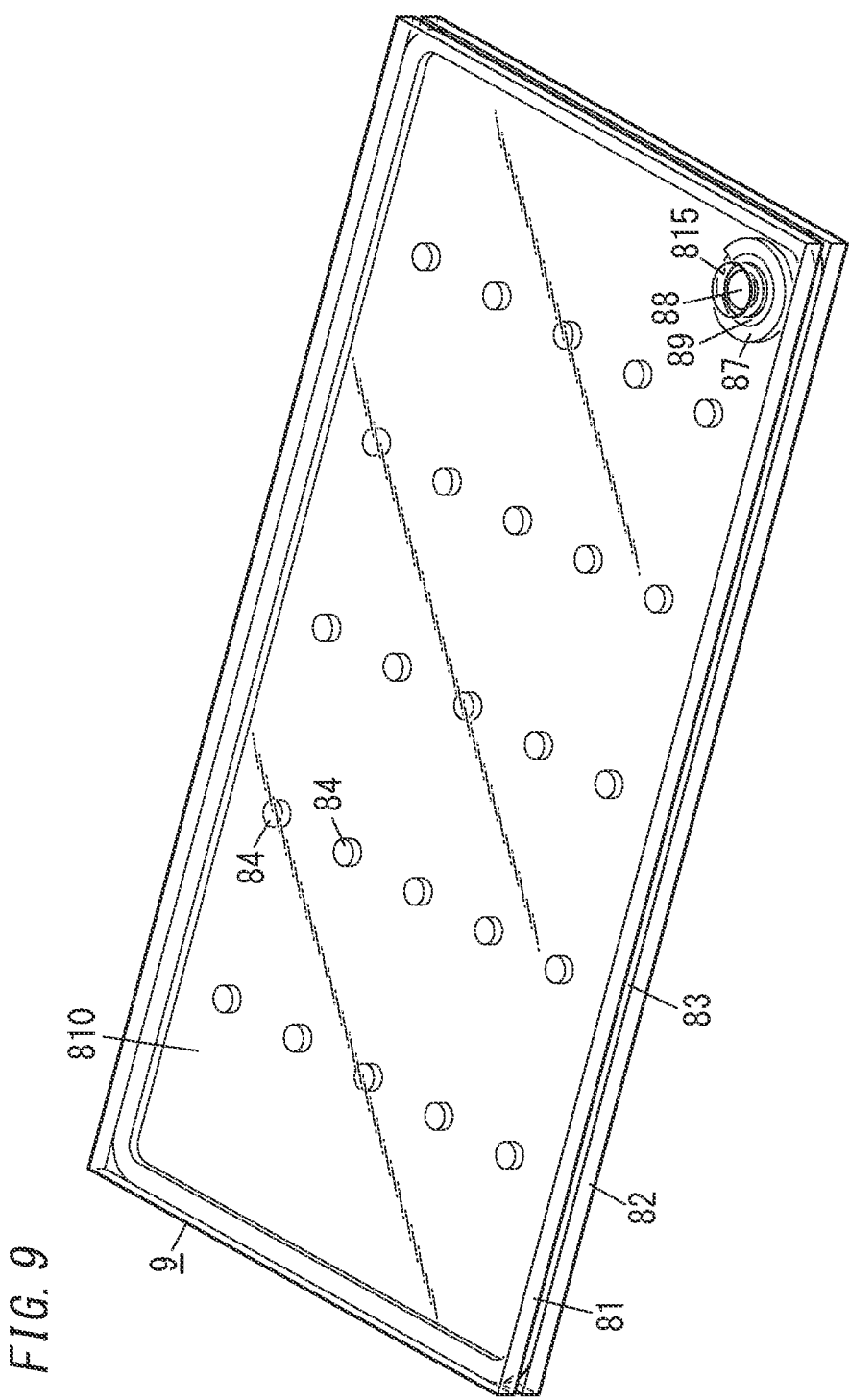
FIG. 9 is a perspective view illustrating a glass panel unit obtained by the manufacturing method.

As schematically illustrated in FIG. 8, the tubular section 75 of the sealing head 7 is connected to a vacuum pump 3 through an exhaust passage 2. The exhaust device 1 used in the evacuation step includes the exhaust passage 2 connected to the sealing head 7, the vacuum pump 3 connected to the exhaust passage 2, a pressure gauge 4 connected to the exhaust passage 2, and a gas introduction path 5 connected to the exhaust passage 2. The exhaust passage 2 is provided with an on-off valve 25, and the gas introduction path 5 is provided with an on-off valve 55.

The sealing head 7 is attached to the work in progress 8, and the exhaust device 1 is driven (i.e., the vacuum pump 3 is driven), thereby exhausting air from the internal space 85 through the evacuation port 815 of the work in progress 8, the sealing head 7, and the exhaust passage 2. A state where the sealing head 7 is attached to the work in progress 8 is, in other words, a state where the sealing head 7 is attached to the first substrate 81.

In the evacuation space 752 of the sealing head 7, a pressing member 76 is disposed. The pressing member 76 integrally includes a base 761 having a plate-like shape and a pushing pin 765 having a columnar shape and protruding downward from part of the base 761. In the evacuation space 752, the pressing member 76 is movable upward/downward (i.e., toward/away from the second substrate 82).

In the evacuation space 752, a spring member 74 configured to apply biasing force to the pressing member 76 is further disposed. The spring member 74 is pressed against the base 761 of the pressing member 76, thereby applying biasing force downward to the pressing member 76. The biasing force applied by the spring member 74 to the pressing member 76 is biasing force that pushes out the pushing pin 765 downward (i.e., in a direction toward the second substrate 82) through the opening 754.

The lower surface of the tubular section 75 has a portion surrounding the opening 754 and provided with an O-ring 77 which is elastic.

The heater 79 supported by the second frame 72 is an infrared radiator configured to emit infrared rays for local heating. The heater 79 is configured to externally irradiate the sealing material 89, which is inserted in the evacuation port 815 and which is heat fusible, with infrared rays through the second substrate 82 which is light transmissive (i.e., through the second glass panel 820), thereby locally heating the sealing material 89.

The heater 79 includes a heat source 791 configured to emit infrared rays and a focusing member 792 configured to focus the infrared rays emitted from the heat source 791 on a target site. The heat source 791 is preferably, but not limited to, a halogen lamp configured to emit near infrared rays.

With the sealing head 7 having the structure described above, the evacuation step is performed in the following way.

To perform the evacuation step, the work in progress 8 is set such that the first substrate 81 keeps its position located above the second substrate 82. In a state where the work in progress 8 is set, the evacuation port 815 is open upward.

As illustrated in FIG. 5, in a state where the sealing head 7 is attached to the corner portion 8a of the work in progress 8, a tip end of the pushing pin 765 protruding downward through the opening 754 of the tubular section 75 is pressed by the biasing force applied from the spring member 74 against an upper surface of the plate 88. The sealing material 89 and the plate 88 are vertically sandwiched between the second substrate 82 and the pressing member 76 by the biasing force applied from the spring member 74.

This brings the O-ring 77 of the sealing head 7 into airtight contact with the area, surrounding the evacuation port 815 entirely, of an upper surface of the first substrate 81.

In this state, opening the on-off valve 25 of the exhaust device 1 shown in FIG. 8 to drive the vacuum pump 3 discharges air from the evacuation space 752 of the sealing head 7 (see the hollow arrow in FIG. 5), and the internal space 85 of the work in progress 8 is evacuated to, for example, the degree of vacuum of 0.1 Pa or lower.

Next, the sealing step will be described. In the sealing step, the heater 79 supported by the second frame 72 is used to seal the evacuation port 815 while the evacuated state in the internal space 85 is maintained.

Figure 6:
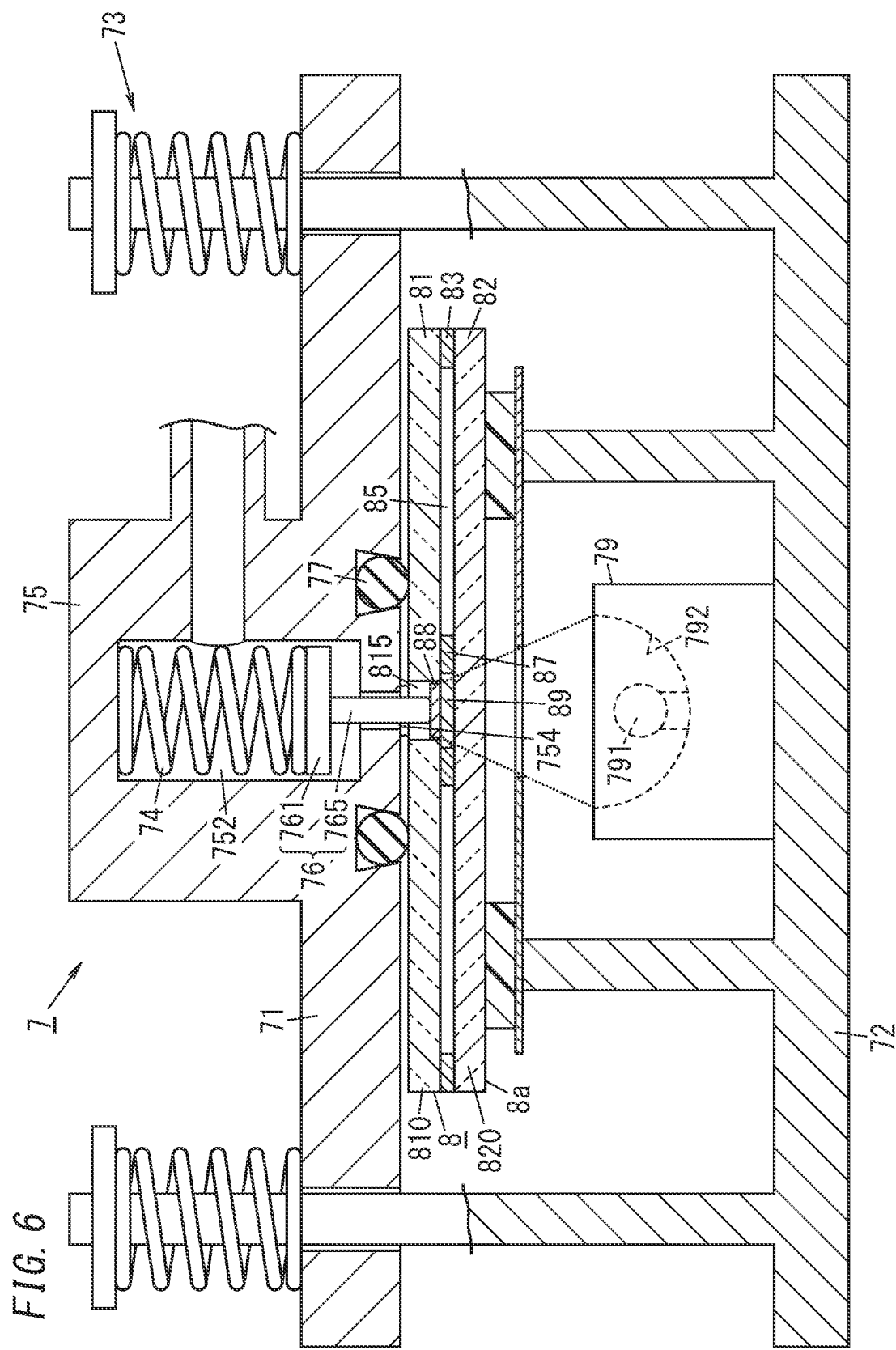
FIG. 6 is a sectional view illustrating one state in a sealing step of the manufacturing method.

When the evacuated state in the internal space 85 is maintained, the heater 79 locally heats, in a non-contact manner, the sealing material 89 inserted in the evacuation port 815 (see FIG. 6).

The sealing material 89 locally heated starts softening when a prescribed softening point is reached. The sealing material 89 thus softened is pushed toward the second substrate 82 by the biasing force applied by the spring member 74 via the pressing member 76 and the plate 88 to the sealing material 89 and is deformed in the internal space 85. At that time, the sealing material 89 is pressed to spread in a direction orthogonal to a direction in which the first substrate 81 and the second substrate 82 face each other.

Figure 7:
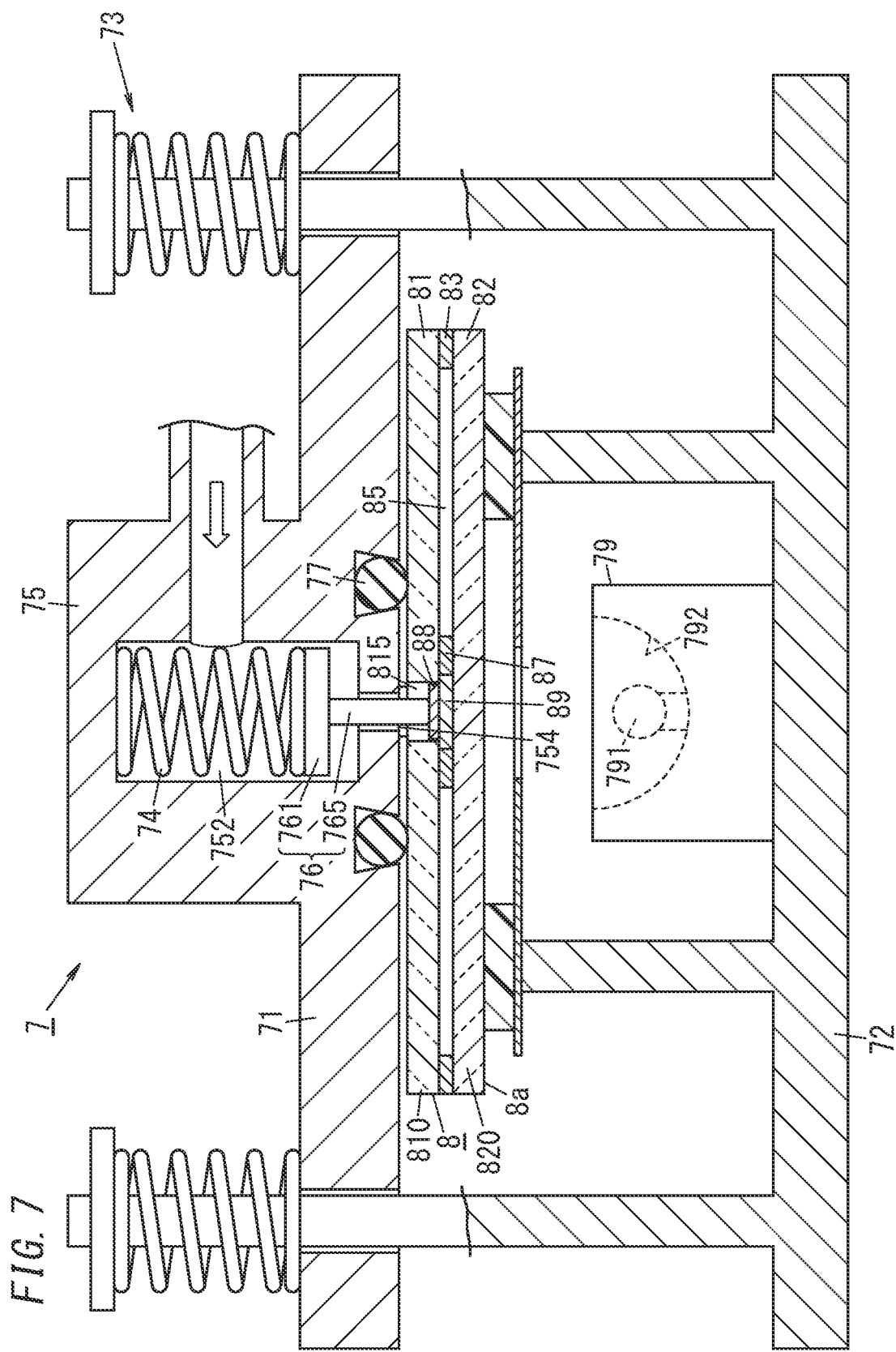
FIG. 7 is a sectional view illustrating a next state of the one state of the sealing step.

In the sealing step, when the sealing material 89 thus softened (in other words, the sealing material 89 with increased flowability) blocks ventilation between the evacuation port 815 and the internal space 85, vacuuming of the exhaust device 1 is stopped (i.e., the vacuum pump 3 is stopped) and the on-off valve 55 of the gas introduction path 5 is opened. This introduces air through the gas introduction path 5 into the exhaust passage 2. The air introduced into the exhaust passage 2 is supplied through the exhaust passage 2 and the evacuation space 752, communicated therewith, of the tubular section 75 toward the evacuation port 815 (see the hollow arrow in FIG. 7).

The pressure of the air supplied here acts to further push the sealing material 89 thus softened toward the second substrate 82. Thus, the sealing material 89 is pressed to spread in a balanced manner. That is, in the sealing step of the manufacturing method of the one embodiment, the sealing material 89 is pressed to spread at first by the pressure of the pushing pin 765, and subsequently, the sealing material 89 is pressed to spread in a balanced manner by the pressure of the air in addition to the pressure of the pushing pin 765.

Moreover, microbubbles may be formed in the interior of the sealing material 89 when the sealing material 89 is softened (melted), but those microbubbles are burst by applying the pressure of the air to the sealing material 89 thus softened.

The air supplied through the gas introduction path 5 is preferably heated dry air. The temperature of the air to be supplied is preferably a temperature within the range of a general room temperature to 300° C. In the sealing step of the manufacturing method of the one embodiment, the temperature of the air to be supplied through the gas introduction path 5 is, for example, a temperature within the range of 100° C. to 300° C., more preferably a temperature within the range of 200° C. to 300° C.

The closer the temperature of the air to be supplied through the gas introduction path 5 is to the temperature of the sealing material 89, the more the sealing of the evacuation port 815 is suppressed from being influenced by damage or the like caused by a rapid change in the temperature of the sealing material 89. The air to be supplied through the gas introduction path 5 is, with reference to the softening point of the sealing material 89, preferably a temperature within the range of +/−100° C. from the softening point, more preferably a temperature within the range of +/−50° C. from the softening point.

In the manufacturing method of the one embodiment, heating of the sealing material 89 is stopped when the air is supplied to the exhaust passage 2, but the air may be introduced while the heating of the sealing material 89 is continued.

Moreover, in the insertion step of the manufacturing method of the one embodiment, the plate 88 is inserted into the evacuation port 815, but the plate 88 is not essential. The tip end of the pushing pin 765 may be directly pressed against the sealing material 89 without inserting the plate 88 into the evacuation port 815. In this case, if the location of the pushing pin 765 is shifted, pressing the sealing material 89 to spread in a balanced manner becomes difficult, but eventually, the pressure of the air enables the sealing material 89 to be pressed to spread in a balanced manner.

Moreover, in the manufacturing method of the one embodiment, the dam 87 for restricting the deformation range of the sealing material 89 is disposed in the internal space 85, but the dam 87 is not essential. Without providing the dam 87 in the internal space 85, the sealing material 89 may be deformed in the internal space 85, and the sealing material 89 after the deformation may seal the evacuation port 815.

The manufacturing method of the one embodiment has been described above. According to the manufacturing method, simple processes performed with the exhaust device 1 and the sealing head 7 evacuate the internal space 85 of the work in progress 8, and the evacuation port 815 used for the evacuation can be highly reliably sealed with the sealing material 89. The glass panel unit 9 thus manufactured has no trace of the exhaust pipe, which is, however; left in a conventional technique.

Next, various types of variations of the manufacturing method of the one embodiment will be described. In the description of the variations, components similar to those described above will be designated by the same reference signs as those in the above description, and the detailed description thereof will be omitted herein. Components different from those described above will be described below.

(First Variation)

Figure 10:
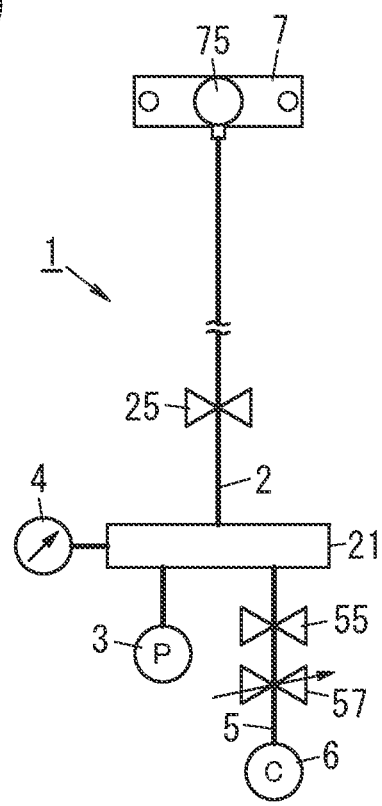
FIG. 10 is a view schematically illustrating an exhaust device used in a first variation of the manufacturing method.

FIG. 10 schematically shows an exhaust device 1 used in a first variation of the manufacturing method of the one embodiment. The exhaust device 1 used in the first variation further includes: a compressor 6 connected to an exhaust passage 2 via a gas introduction path 5; and a regulator 57 for pressure adjustment provided in a flow path of the gas introduction path 5.

That is, in the exhaust device 1 used in the first variation, the gas introduction path 5 is disposed between the compressor 6 for supplying compressed air and the exhaust passage 2, and an on-off valve 55 and the regulator 57 are disposed in the flow path of the gas introduction path 5.

In a sealing step of the first variation, when a sealing material 89 softened by being heated blocks ventilation between an evacuation port 815 and an internal space 85, vacuuming of the exhaust device 1 is stopped a vacuum pump 3 is stopped), the on-off valve 55 in the gas introduction path 5 is opened, and the compressor 6 is driven. The compressed air sent from the compressor 6 to the gas introduction path 5 is subjected to pressure adjustment via the regulator 57, is then supplied to the exhaust passage 2, and is supplied through an evacuation space 752 of the sealing head 7 toward the evacuation port 815.

The temperature of the compressed air to be supplied from the compressor 6 is preferably higher than a general room temperature and is preferably lower than or equal to 300° C. The temperature of the compressed air to be supplied from the compressor 6 is, for example, a temperature within the range of 100° C. to 300° C., more preferably a temperature within the range of 200° C. to 300° C. The closer the temperature of the compressed air to be supplied from the compressor 6 is to the temperature of the sealing material 89, the more the sealing of the evacuation port 815 is suppressed from being influenced by damage or the like caused by a rapid change in the temperature of the sealing material 89. The temperature of the compressed air to be supplied is, with reference to the softening point of the sealing material 89, preferably a temperature within the range of +/−100° C. from the softening point, more preferably a temperature within the range of +/−50° C. from the softening point.

Heating of the sealing material 89 is stopped when the compressed air is supplied from the compressor 6 to the exhaust passage 2, but the compressed air may be supplied while the heating of the sealing material 89 is continued.

A tip end of the pushing pin 765 may be directly pressed against the sealing material 89 without inserting the plate 88 into the evacuation port 815. In this case, if the location of the pushing pin 765 is shifted, pressing the sealing material 89 to spread in a balanced manner becomes difficult, but eventually, the pressure of the compressed air enables the sealing material 89 to be pressed to spread in a balanced manner.

(Second Variation)

Figure 11:
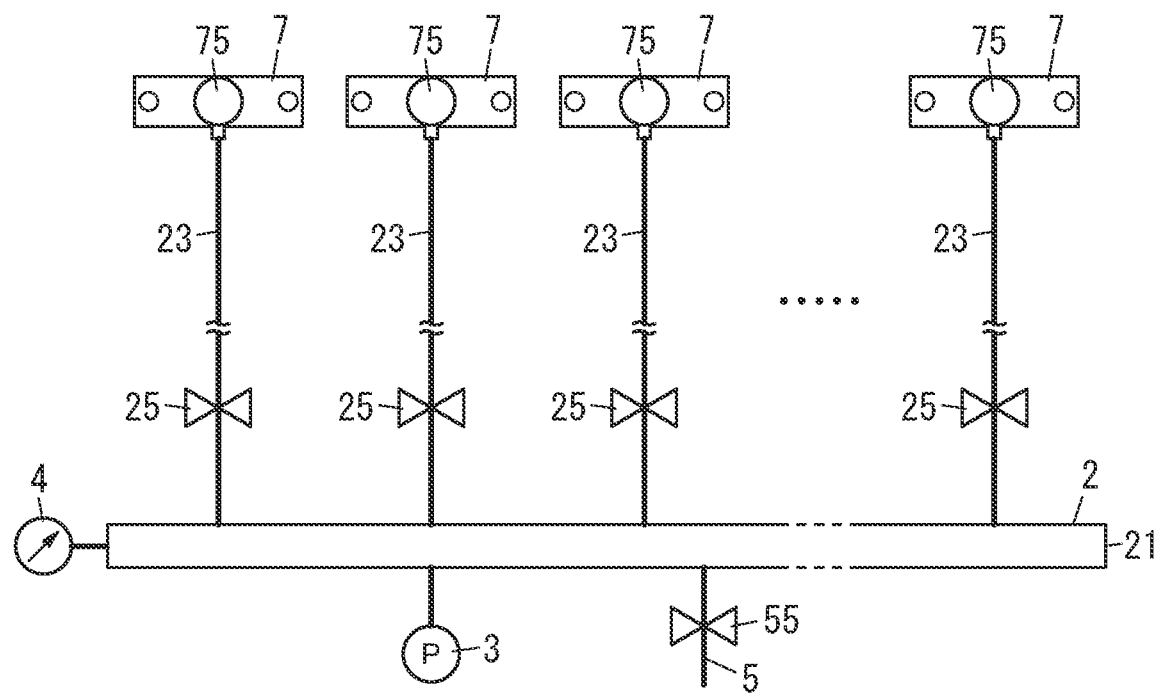
FIG. 11 is a view schematically illustrating an exhaust device used in a second variation of the manufacturing method.

FIG. 11 schematically shows an exhaust device 1 used in a second variation. The second variation includes a plurality of sealing heads 7. The exhaust device 1 used in the second variation includes the exhaust passage 2 connected to the plurality of sealing heads 7, the vacuum pump 3 connected to the exhaust passage 2, a pressure gauge 4 connected to the exhaust passage 2, and a gas introduction path 5 connected to the exhaust passage 2.

The exhaust passage 2 includes a manifold 21 and a plurality of pipelines 23 connected to the plurality of sealing heads 7 on a one-to-one basis. Each of the plurality of pipelines 23 is connected to the manifold 21. The plurality of pipelines 23 are provided with respective on-off valves 25. The vacuum pump 3, the pressure gauge 4, and the gas introduction path 5 are connected to the manifold 21.

In an evacuation step of the second variation, the plurality of sealing heads 7 are attached to a plurality of works in progress 8 on a one-to-one basis, and in this state, the vacuum pump 3 is driven, and thereby, the exhaust device 1 is vacuumed and internal spaces 85 of the plurality of works in progress 8 are simultaneously evacuated.

In a sealing step of the second variation, respective sealing materials 89 of the plurality of works in progress 8 are heated, and in a state where the internal spaces 85 are closed with the sealing materials 89 thus softened, vacuuming of the exhaust device 1 is stopped (i.e., the vacuum pump 3 is stopped), and an on-off valve 55 is opened to introduce air into the exhaust passage 2. The air introduced into the exhaust passage 2 is supplied through the plurality of pipelines 23 and the plurality of sealing heads 7 toward evacuation ports 815 of the plurality of works in progress 8.

The second variation enables the plurality of works in progress 8 to be collectively subjected to the evacuation step and the sealing step to concurrently manufacture a plurality of glass panel units 9.

(Third Variation)

Figure 12:
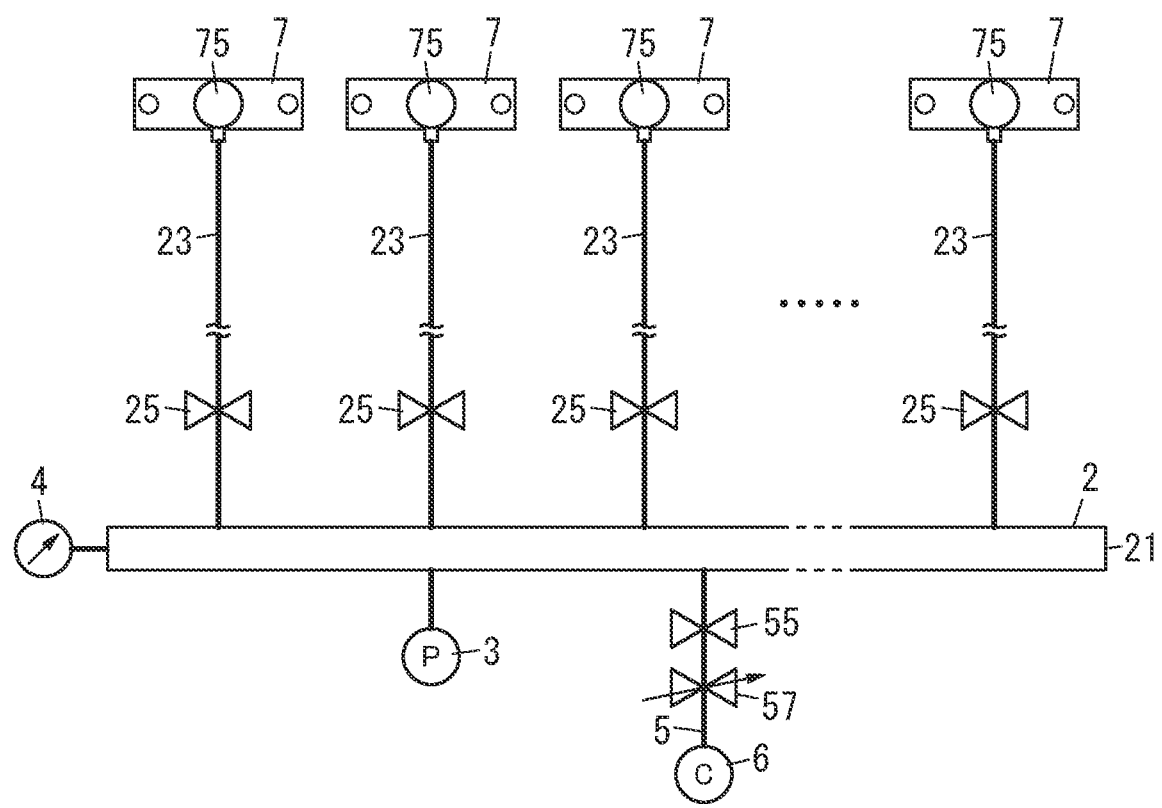
FIG. 12 is a view schematically illustrating an exhaust device used in a third variation of the manufacturing method.

FIG. 12 schematically shows an exhaust device 1 used in a third variation. The exhaust device 1 used in the third variation has a configuration corresponding to a combination of the first variation and the second variation.

That is, the third variation includes a plurality of sealing heads 7 in a similar manner to the second variation. The exhaust device 1 in the third variation includes the exhaust passage 2 connected to the plurality of sealing heads 7, the vacuum pump 3 connected to the exhaust passage 2, a pressure gauge 4 connected to the exhaust passage 2, and a gas introduction path 5 connected to the exhaust passage 2. The exhaust device 1 used in the third variation further includes a compressor 6 connected to the gas introduction path 5 and a regulator 57 for pressure adjustment provided in a flow path of the gas introduction path 5.

The exhaust passage 2 includes a manifold 21 and a plurality of pipelines 23 connected to the plurality of sealing heads 7 on a one-to-one basis. Each of the plurality of pipelines 23 is connected to the manifold 21. The plurality of pipelines 23 are provided with respective on-off valves 25. The vacuum pump 3, the pressure gauge 4, and the gas introduction path 5 are connected to the manifold 21.

In an evacuation step of the third variation, the plurality of sealing heads 7 are attached to a plurality of works in progress 8 on a one-to-one basis, and in this state, the vacuum pump 3 is driven, and thereby, internal spaces 85 of the plurality of works in progress 8 are simultaneously evacuated.

In a sealing step of the third variation, respective sealing materials 89 of the plurality of works in progress 8 are heated, and in a state where the internal spaces 85 are closed with the sealing materials 89 thus softened, the vacuum pump 3 of the exhaust device 1 is stopped, an on-off valve 55 of the gas introduction path 5 is opened, and the compressor 6 is driven. The compressed air sent from the compressor 6 to the gas introduction path 5 is subjected to pressure adjustment via the regulator 57, is then supplied to the exhaust passage 2, and is supplied through the plurality of pipelines 23 and the plurality of sealing heads 7 toward evacuation ports 815 of the plurality of works in progress 8.

The third variation enables the plurality of works in progress 8 to be collectively subjected to the evacuation step and the sealing step to concurrently manufacture a plurality of glass panel units 9.

(Aspects)

As can be seen from the one embodiment and various types of variations of the one embodiment, a glass panel unit manufacturing method of a first aspect includes a bonding step, an insertion step, an evacuation step, and a sealing step. The bonding step includes bonding a first substrate (81) and a second substrate (82) together with a bonding material (83) provided between the first substrate (81) and the second substrate (82) and having a frame shape. The first substrate (81) includes a glass panel (810) and has an evacuation port (815). The second substrate (82) includes a glass panel (820), Thus, an internal space (85) surrounded by the bonding material (83) is formed between the first substrate (81) and the second substrate (82). The insertion step includes inserting a sealing material (89) into the evacuation port (815) of the first substrate (81). The evacuation step includes evacuating the internal space (85) through an exhaust passage (2) by detachably connecting the exhaust passage (2) to the evacuation port (815). The sealing step includes: deforming the sealing material by heating; and sealing the evacuation port (815) with the sealing material (89) deformed by being heated while an evacuated state in the internal space (85) is maintained. The sealing step includes supplying gas through the exhaust passage (2) toward the evacuation port (815) in a state where the sealing material (89) softened by being heated blocks ventilation between the evacuation port (815) and the internal space (85).

According to the glass panel unit manufacturing method of the first aspect, the gas supplied in the sealing step applies, to the sealing material (89), pressure that pushes the sealing material (89) toward the second substrate (82). Thus, the sealing material (89) is pressed to spread in a balanced manner. In addition, microbubbles formed while the sealing material 89 is softened can be burst by the pressure of the gas. Thus, according to the glass panel unit manufacturing method of the first aspect, the evacuation port (815) fused for evacuation of the internal space (85) is be highly reliably sealed with the sealing material (89) while the evacuated state in the internal space (85) is maintained. The glass panel unit (9) manufactured has no trace of the exhaust pipe, which is, however, left in a conventional technique.

A glass panel unit manufacturing method of a second aspect is realized in combination with the first aspect. In the glass panel unit manufacturing method of the second aspect, the gas supplied through the exhaust passage (2) toward the evacuation port (815) is heated external air.

The glass panel unit manufacturing method of the second aspect suppresses damage or the like from being caused by a rapid temperature drop in part of the work in progress (8) of the glass panel unit (9) due to the influence of the gas supplied.

A glass panel unit manufacturing method of a third aspect is realized in combination with the first aspect. In the glass panel unit manufacturing method of the third aspect, the gas supplied through the exhaust passage (2) toward the evacuation port (815) is compressed air.

The glass panel unit manufacturing method of the third aspect enables the sealing material (89) to be pressed to spread in a balanced manner by the compressed air. In addition, microbubbles formed while the sealing material 89 is softened can be burst by the pressure of the compressed air.

A glass panel unit manufacturing method of a fourth aspect is realized in combination with any one of the first to third aspects. In the glass panel unit manufacturing method of the fourth aspect, the gas has a temperature in a range of 100° C. to 300° C.

The glass panel unit manufacturing method of the fourth aspect suppresses damage or the like from being caused by a rapid temperature change in part of the work in progress (8) of the glass panel unit (9) due to the influence of the gas supplied.

A glass panel unit manufacturing method of a fifth aspect is realized in combination with any one of the first to third aspects. In the glass panel unit manufacturing method of the fifth aspect, the gas has a temperature in a range of 200° C. to 300° C.

The glass panel unit manufacturing method of the fifth aspect suppresses damage or the like from being caused by a rapid temperature change in part of the work in progress (8) of the glass panel unit (9) due to the influence of the gas supplied.

A glass panel unit manufacturing method of a sixth aspect is realized in combination with any one of the first to third aspects. In the g glass panel unit manufacturing method of the sixth aspect, the gas has a temperature in a range of +/−100° C. from a softening point of the sealing material (89).

The glass panel unit manufacturing method of the sixth aspect suppresses sealing of the evacuation port (815) from being influenced by damage or the like due to a rapid change in the temperature of the sealing material (89).

A glass panel unit manufacturing method of a seventh aspect is realized in combination with any one of the first to third aspects. In the glass panel unit manufacturing method of the seventh aspect, the gas has a temperature in a range of +/−50° C. from a softening point of the sealing material (89).

The glass panel unit manufacturing method of the seventh aspect suppresses sealing of the evacuation port (815) from being influenced by damage or the like due to a rapid change in the temperature of the sealing material (89).

A glass panel unit manufacturing method of an eighth aspect is realized in combination with any one of the first to seventh aspects. In the glass panel unit manufacturing method of the eighth aspect, the evacuation step and the sealing step are performed with an exhaust device (1) having the exhaust passage (2) and a sealing head (7) connected to the exhaust passage (2) in a state where the sealing head (7) is attached to the first substrate (81). The sealing step includes supplying gas through the exhaust passage (2) and the sealing head (7) toward the evacuation port (815).

Thus, according to the glass panel unit manufacturing method of the eighth aspect, the evacuation port (815) fused for evacuation of the internal space (85) is be highly reliably sealed with the sealing material (89) by simple processes with the exhaust device (1) and the sealing head (7) while the evacuated state in the internal space (85) is maintained.

A glass panel unit manufacturing method of a ninth aspect is realized in combination with the eighth aspect. In the glass panel unit manufacturing method of the ninth aspect, in the evacuation step and the sealing step, a plurality of the sealing heads (7) are used.

The glass panel unit manufacturing method of the ninth aspect enables a plurality of glass panel units (9) to be concurrently manufactured with the plurality of sealing heads (7).

A glass panel unit manufacturing method of a tenth aspect is realized in combination with the third aspect. In the glass panel unit manufacturing method of the tenth aspect, the evacuation step and the sealing step are per with an exhaust device (1) having the exhaust passage (2) and a compressor (6) connected to the exhaust passage (2) and a sealing head (7) connected to the exhaust passage (2) in a state where the sealing head (7) is attached to the first substrate (81). The sealing step includes supplying compressed gas from the compressor (6) through the exhaust passage (2) and the sealing head (7) toward the evacuation port (815).

Thus, according to the glass panel unit manufacturing method of the tenth aspect, the evacuation port (815) fused for evacuation of the internal space (85) is be highly reliably sealed with the sealing material (89) by simple processes with the exhaust device (1) and the sealing head (7) while the evacuated state in the internal space (85) is maintained.

A glass panel unit manufacturing method of an eleventh aspect is realized in combination with the tenth aspect. In the glass panel unit manufacturing method of the eleventh aspect, in the evacuation step and the sealing step, a plurality of the sealing heads (7) are used.

The glass panel unit manufacturing method of the eleventh aspect enables a plurality of glass panel units (9) to be concurrently manufactured with the plurality of sealing heads (7).

A glass panel unit manufacturing method of the twelfth aspect is realized in combination with any one of the first to eleventh aspects. In the glass panel unit manufacturing method of the twelfth aspect, in the sealing step, the sealing material (89) softened by being heated is deformed by being pressed by the pressing member (76) inserted into the evacuation port (815). The sealing material (89) deformed by being pressed blocks ventilation between the evacuation port (815) and the internal space (85).

In the glass panel unit manufacturing method of a twelfth aspect, the sealing material (89) is first pressed to spread by the pressing member (76), the pressure of the gas is then further applied to the sealing material (89), and thereby, the sealing material (89) is pressed to spread in a balanced manner.

A glass panel unit manufacturing method of the thirteenth aspect is realized in combination with any one of the first to twelfth aspects. In the glass panel unit manufacturing method of the thirteenth aspect, the sealing step includes irradiating the sealing material (89) with infrared rays through the second substrate (82) to locally heat the sealing material (89).

The glass panel unit manufacturing method of the thirteenth aspect enables the sealing material (89) to be efficiently locally heated while the evacuated state in the internal space (85) is maintained.

REFERENCE SIGNS LIST

2 EXHAUST PASSAGE
76 PRESSING MEMBER
81 FIRST SUBSTRATE
810 GLASS PANEL
815 EVACUATION PORT
82 SECOND SUBSTRATE
820 GLASS PANEL
83 BONDING MATERIAL
85 INTERNAL SPACE
89 SEALING MATERIAL
9 GLASS PANEL UNIT

The invention claimed is:

1. A glass panel unit manufacturing method, comprising:
   a bonding step of bonding a first substrate and a second substrate together with a bonding material provided between the first substrate and the second substrate and having a frame shape to form an internal space, the first substrate including a glass panel and having an evacuation port, the second substrate including a glass panel, the internal space being surrounded by the bonding material between the first substrate and the second substrate;
   an insertion step of inserting a sealing material into the evacuation port of the first substrate;
   an evacuation step of evacuating the internal space through an exhaust passage by detachably connecting the exhaust passage to the evacuation port; and
   a sealing step of: deforming the sealing material by heating; and sealing the evacuation port with the sealing material deformed by being heated while an evacuated state in the internal space is maintained,
   the sealing step including supplying gas through the exhaust passage toward the evacuation port in a state where the sealing material softened by being heated blocks ventilation between the evacuation port and the internal space.

2. The glass panel unit manufacturing method of claim 1, wherein
   the gas is heated external air.

3. The glass panel unit manufacturing method of claim 1, wherein
   the gas is compressed air.

4. The glass panel unit manufacturing method of claim 1, wherein
   the gas has a temperature in a range of 100° C. to 300° C.

5. The glass panel unit manufacturing method of claim 1, wherein
   the gas has a temperature in a range of 200° C. to 300° C.

6. The glass panel unit manufacturing method of claim 1, wherein the gas has a temperature in a range of +/−100° C. from a softening point of the sealing material.

7. The glass panel unit manufacturing method of claim 1, wherein
the gas has a temperature in a range of +/−50° C. from a softening point of the sealing material.

8. The glass panel unit manufacturing method of claim 1, wherein
the evacuation step and the sealing step are performed with an exhaust device having the exhaust passage and a sealing head connected to the exhaust passage in a state where the sealing head is attached to the first substrate, and
the sealing step includes supplying gas through the exhaust passage and the sealing head toward the evacuation port.

9. The glass panel unit manufacturing method of claim 8, in the evacuation step and the sealing step, a plurality of the sealing heads are used.

10. The glass panel unit manufacturing method of claim 3, wherein
the evacuation step and the sealing step are performed with an exhaust device having the exhaust passage and a compressor connected to the exhaust passage and a sealing head connected to the exhaust passage in a state where the sealing head is attached to the first substrate, and
the sealing step includes suppling compressed gas from the compressor through the exhaust passage and the sealing head toward the evacuation port.

11. The glass panel unit manufacturing method of claim 10, wherein
in the evacuation step and the sealing step, a plurality of the sealing heads are used.

12. A glass panel unit manufacturing method of claim 1, wherein
in the sealing step, the sealing material softened by being heated is deformed by being pressed by the pressing member inserted into the evacuation port, and the sealing material deformed by being pressed blocks ventilation between the evacuation port and the internal space.

13. The glass panel unit manufacturing method of claim 1, wherein
the sealing step includes irradiating the sealing material with infrared rays through the second substrate to locally heat the sealing material.

* * * * *